United States Patent [19]

Heidelberg et al.

[11] Patent Number: 5,474,429
[45] Date of Patent: Dec. 12, 1995

[54] FLUID-DISPLACEMENT APPARATUS ESPECIALLY A BLOWER

[76] Inventors: Götz Heidelberg, Petersbrunnenstrasse 2, 82319 Starnberg; Otto Stuckmann, Lisztstrasse 31, 45657 Recklinghausen, both of Germany

[21] Appl. No.: 179,967

[22] Filed: Jan. 11, 1994

[51] Int. Cl.[6] ............................ F04B 35/04
[52] U.S. Cl. ............... 417/356; 417/423.8; 310/63
[58] Field of Search ............... 417/356, 423.1, 417/423.8, 423.7; 310/54, 57, 63

[56] References Cited

U.S. PATENT DOCUMENTS

| | | | |
|---|---|---|---|
| 1,347,732 | 7/1920 | Cooper. | |
| 3,422,275 | 1/1969 | Braikevitch | 417/356 |
| 4,831,297 | 5/1989 | Taylor et al. | 417/356 |
| 4,862,023 | 8/1989 | Laumond et al. | 310/54 |
| 4,949,022 | 8/1990 | Lipman | 310/63 |
| 4,962,734 | 10/1990 | Jorgensen. | |
| 5,079,488 | 1/1992 | Harms et al. | 417/356 |

FOREIGN PATENT DOCUMENTS

| | | |
|---|---|---|
| 0096515 | 12/1983 | European Pat. Off.. |
| 0140461 | 5/1985 | European Pat. Off.. |
| 1038641 | 6/1953 | Germany. |
| 3718954 | 12/1980 | Germany. |
| 1439806 | 6/1976 | United Kingdom. |
| 91/13256 | 9/1991 | WIPO. |
| 91/19103 | 12/1991 | WIPO. |

Primary Examiner—Richard A. Bertsch
Assistant Examiner—Charles G. Freay
Attorney, Agent, or Firm—Herbert Dubno

[57] ABSTRACT

A fluid-displacement apparatus, especially a blower, has a stator of an electric motor directly driving the impeller integrated in the flow passage housing while the rotor of the electric motor is surrounded by the stator and is mounted on the ends of the blades of the impeller or propeller.

17 Claims, 3 Drawing Sheets

FLUID-DISPLACEMENT APPARATUS ESPECIALLY A BLOWER

FIELD OF THE INVENTION

Our present invention relates to a fluid-displacement apparatus, especially an apparatus for displacing a gas such as air, e.g. a blower, of the type in which a flow passage housing of circularly cylindrical cross section has an impeller therein which is rotatable about the axis of the housing and is directly driven by an electric motor. Advantageously the impeller has the configuration of a propeller, i.e. can have a plurality of generally radial vanes or blades.

BACKGROUND OF THE INVENTION

In the field of fluid displacement, it is common practice to provide an impeller which is rotatable in a housing forming a flow passage or forming part of a flow passage and through which the impeller displaces the fluid generally axially, i.e. from an inlet side of an outlet side along the axis of rotation of the impeller. Depending upon the purpose of the fluid displacement device, it can be used to move volumes of the fluid from one place to another or to simply move around the fluid. The fluid itself can be a gas or gas mixture, in which case the fluid displacement apparatus can be a blower or fan. Alternatively the fluid can be a liquid, in which case the fluid displacement apparatus can be denominated a pump or an agitator or mixer.

Fluid-displacement apparatus of the aforedescribed type in the form of blowers are known and are generally driven with relatively low power electric motors. For electric power units of 10 kW or more, the electric motor is usually connected to the hub of the impeller or propeller by an efficiency-reducing transmission, the connections being made by flanging one part to another.

Blower units of this type are heavy, are bulky and generally require a special foundation. With an aligned arrangement of the hub of the transmission and the electric motor, the inflowing fluid flow lines are distorted and, in general, the flow characteristics through the unit can be adversely affected. In addition, this type of blower unit has an intolerable noise level when operated at high powers.

OBJECTS OF THE INVENTION

It is the principal object of our present invention to provide an improved fluid-displacement apparatus, especially a blower but not necessarily limited to a blower, which can have high electrical power (of 10 kW or more) but which is lighter and produces less noise than earlier apparatus for this purpose.

Another object of this invention is to provide an improved fluid-displacement apparatus which is of a comparatively simple construction and can be fabricated at low cost.

It is also an object of this invention to provide an improved blower, fan or the like which is more efficient than earlier systems.

SUMMARY OF THE INVENTION

These objects are attained, in accordance with the invention by providing the electric motor as an internal rotor motor with a circular ring-shaped rotor element formed around the outer periphery of the impeller and by providing the stator so that it is integrated in the flow duct housing.

By structurally merging or integrating the impeller element and the flow duct housing on the one hand and the electric motor on the other hand, the transmission hitherto used between the motor and the impeller can be eliminated and there is, as a result, a significant reduction in the weight of the unit so that any foundation provided for the unit can be much smaller and noise emission reduced by comparison with systems having transmissions.

According to a feature of the invention, the rotor is mounted on the outer blade ends of a propeller which is rotatable about the axis. This can be achieved by directly screwing the rotor onto the blade ends or by integrating into the impeller structural components for directly mounting the rotor thereon.

For journaling the impeller after it has been united with the rotor, two generally equivalent approaches can be considered. In one approach the rotatable assembly is journaled at its hub while in the other approach the rotor or outer ring is journaled in the housing.

The electric motor can be a permanent magnet excited synchronous motor with electrical commutation of the stator current. Especially appropriate in this connection are electric motors which operate in accordance with the flux collection principle to increase the permanent magnetic flux density in the air gap.

Such motors are readily controllable so that the requirements for adjustability of the characteristics of the system can be fulfilled.

The electric motor can be constructed with relatively small air gaps and comparatively high air gap velocities. Both lead to an increase in the efficiency.

In order to increase the reliability of the overall system, it has been found to be advantageous to hermetically enclose or encapsulate the rotor and stator so that aggressive and corrosive media cannot attack them.

It has also been found to be advantageous to provide the stator with a liquid cooling arrangement. The cooling medium is preferably water. This provides an anti-explosion protection in the system. Cooling media which are ignitable or combustible should only be used if such measures are taken to prevent explosion.

The flow duct has an intake part, a diffuser part forming an outlet, and a motor housing part between the intake part and the diffuser part. To that extent the intake part and the diffuser part are standard elements. The motor housing part or the flow passage part are manufactured preferably from synthetic resin material (plastic) at least in the region of the stator.

According to the invention, the fluid displacement apparatus can comprise:

a cylindrical flow duct of circular cross section having an axis;

an impeller rotatable about the axis in the duct;

a ring-shaped rotor of an internal-rotor electric motor formed on an outer periphery of the impeller; and a stator of the electric motor integrated with the flow duct so that a wall of the stator surrounding the rotor is flush with a wall of the duct upstream of and downstream of the stator.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
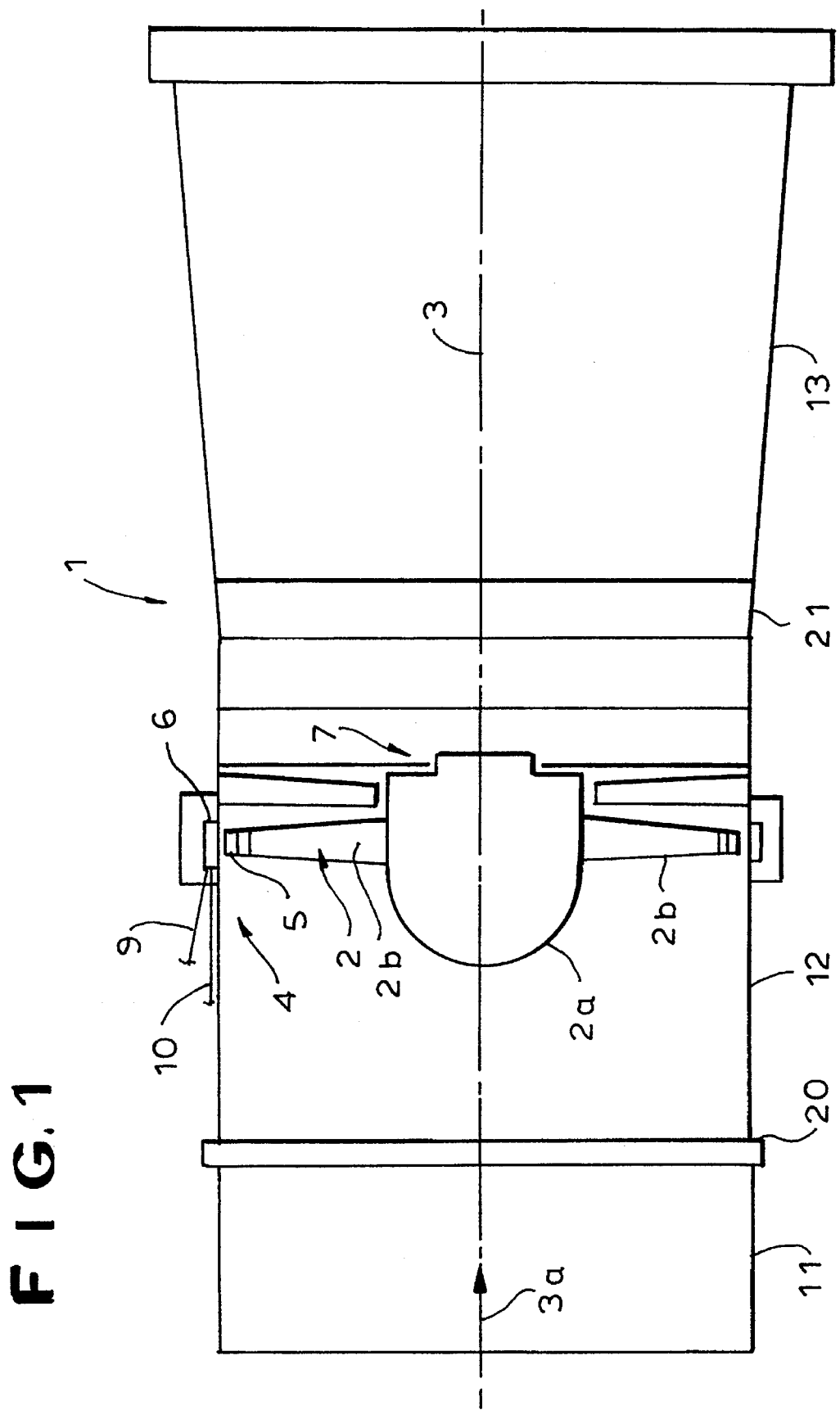
FIG. 1 is a diagrammatic axial section through a first embodiment of the invention.

The fluid displacement device shown in the drawing is a blower which basically comprises a housing 1 (FIGS. 1 and 2) forming a flow passage with a circularly cylindrical cross section, and an impeller 2 which, in the embodiment of FIG. 1, can have a hub 2a and vanes or blades 2b extending radially from the hub and pitched so as to generate a flow of air or other fluid along the axis 3 in the direction of the arrow 3a.

The impeller 2, here basically a propeller, is journaled for rotation about the axis 3 and is directly driven by an electric motor 4, i.e. without the intervention of any transmission.

The electric motor 4 is here an internal-rotor electric motor whose rotor 5 has a configuration of a circular ring and is mounted on the periphery of the impeller 2, i.e. on the outer tips of the blades 2b.

Juxtaposed radially with the rotor 5 and forming part of the motor 4 is a stator 6 which is built into the flow passage housing 1 and, being integrated therewith, at least along the inner wall of this housing is flush therewith.

Figure 2:
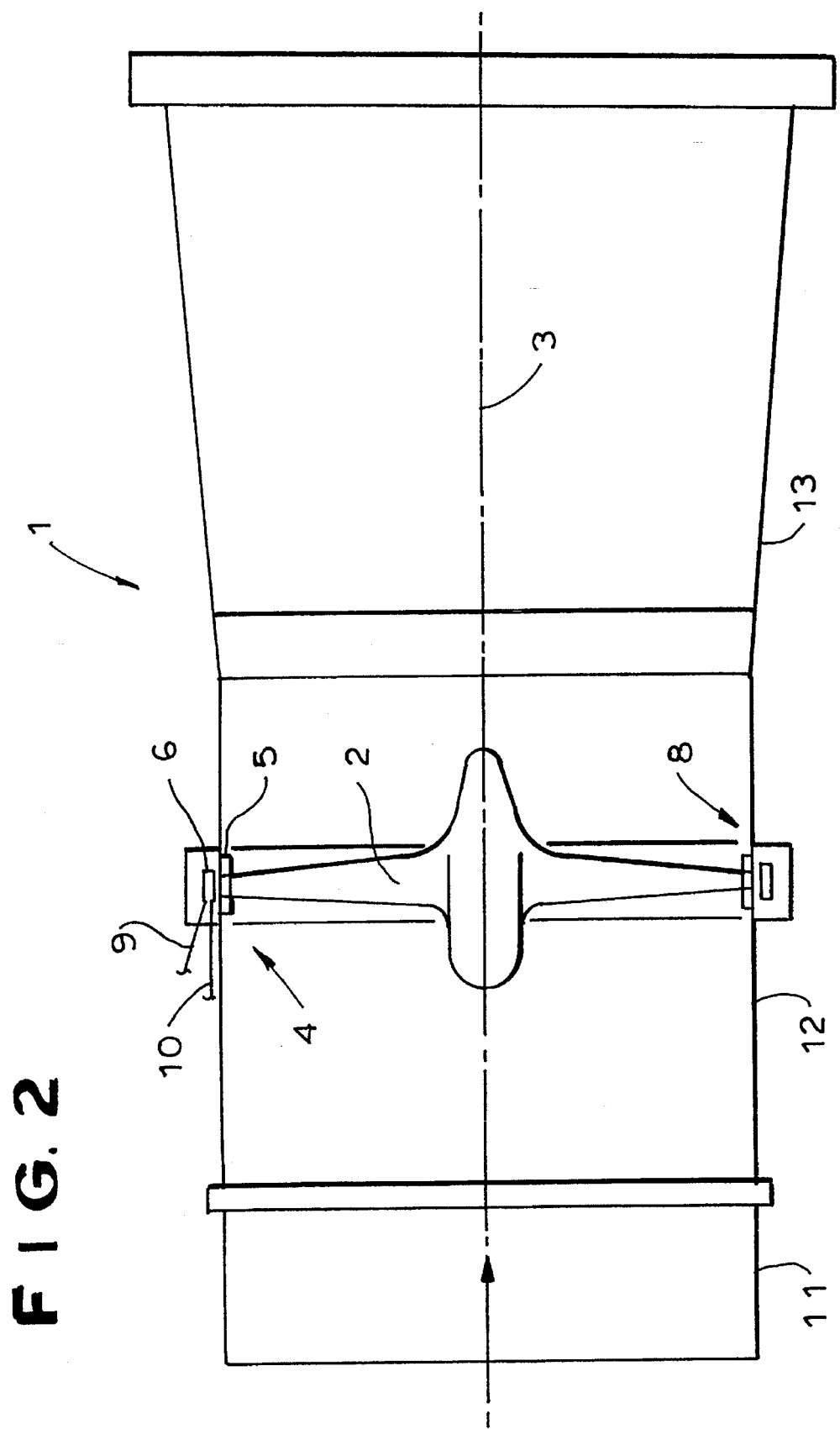
FIG. 2 is an axial diagrammatic section through a second embodiment.

In the embodiment of FIG. 1, the rotor 5 is journaled at 7 at its hub. In the embodiment of FIG. 2 (see also FIG. 3) the rotor 5 is peripherally journaled in the housing with an outer annular bearing system represented generally at 8. In both cases, the electric motor 4 is formed as a permanent magnet synchronous motor with electronic commutation of the stator current and which can be constructed in accordance with the flux collection principle to increase the permanent magnetic flux density in the air gap.

As represented at 9 in FIGS. 1 and 2, a liquid cooling circulation through the stator is possible to cool the latter. The housing 1 enclosing the stator need only be provided with two passages, one for the liquid inlet and outlet pipes for the coolant the other for the cable 10 making the electrical connections to the stator.

The flow passage housing 1 has an intake part 11, the motor housing part 12 and the diffuser part 13 which can be connected together by flange connections as represented at 20 in FIG. 1 or by any other duct-connecting system represented generally at 21 in this Figure. In the region of the stator 6 the housing 1 can be formed from a synthetic resin material.

Figure 3:
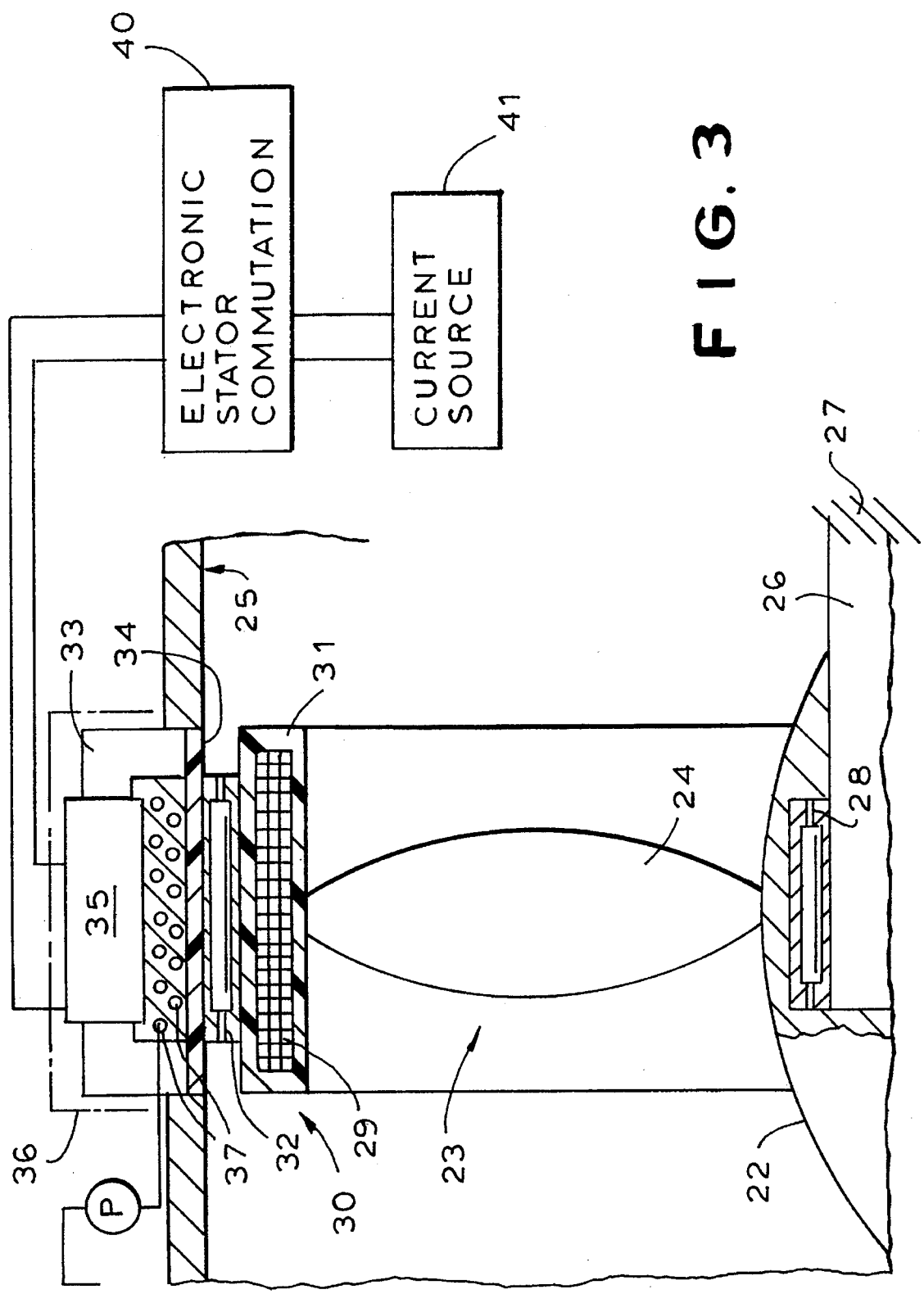
FIG. 3 is a cross sectional view, partly broken away, through another embodiment with hub journaling and peripheral journaling of the impeller.

FIG. 3 shows that a hub 22 of an impeller 23 having the blades 24 can be journaled in the housing 25 on a shaft 26 connected to the housing 25 by a spider or the like represented diagrammatically only at 27. Between the hub 22 and the shaft 26 is a roller bearing 28 to provide the hub journaling of the impeller.

The rotor 29 of the electric motor 30 can consist of coils which are encapsulated in the sheath 31 of synthetic resin material.

The external journaling of the rotor and the impeller can be provided by a roller bearing 32 disposed between the outer periphery of this rotor and the inner wall 34 of the housing which is composed of synthetic resin material.

Permanent magnets 33 of the stator can have exciting coils 35 and can be encapsulated at 36 in a synthetic resin material. Within the stator, in addition, coolant passages 37 are provided and are supplied with the liquid coolant via the pump 38, the liquid coolant returned through a heat exchanger for dissipating the heat picked up by the coolant being not shown.

The means for stator commutation of the stator current is represented by the circuit 40 which is supplied by a current source 41, e.g. of rectified alternating current. The wall 34 is composed of a synthetic resin or plastic as has been described.

We claim:

1. A fluid-displacement apparatus, comprising:

a cylindrical flow duct of circular cross section having an axis;

an impeller rotatable about said axis in said duct;

a ring-shaped rotor of an internal-rotor electric motor formed on an outer periphery of said impeller;

a stator of said electric motor integrated with said flow duct so that a wall of said stator surrounding said rotor is flush with a wall of said duct upstream of and downstream of said stator; and an outer ring bearing journaling said rotor in said duct.

2. The fluid-displacement apparatus defined in claim 1 wherein said impeller has the configuration of a multiblade propeller and said rotor is mounted on outer ends of blades of said propeller.

3. The fluid-displacement apparatus defined in claim 1, further comprising an outer ring bearing journaling said rotor in said duct.

4. The fluid-displacement apparatus defined in claim 1 wherein said electric motor is a permanent magnet stator-excited synchronous motor with electronic commutation of a stator current.

5. The fluid-displacement apparatus defined in claim 1 wherein the electric motor is constructed in accordance with the flux-collection principle to increase permanent magnet flux density in air gaps of the motor.

6. The fluid-displacement apparatus defined in claim 1, further comprising means for hermetically encapsulating said rotor and said stator.

7. The fluid-displacement apparatus defined in claim 1, further comprising means for fluid cooling of said stator.

8. The fluid-displacement apparatus defined in claim 1 wherein said duct is assembled from an intake section, a motor housing section and a diffusor section.

9. The fluid-displacement apparatus defined in claim 1 wherein said duct is formed of a plastic in a region of said stator.

10. The fluid-displacement apparatus defined in claim 1 which constitutes a gas blower.

11. The fluid-displacement apparatus defined in claim 10 wherein said impeller has the configuration of a multiblade propeller and said rotor is mounted on outer ends of blades of said propeller.

12. The fluid-displacement apparatus defined in claim 11 wherein said electric motor is a permanent magnet stator-excited synchronous motor with electronic commutation of a stator current.

13. The fluid-displacement apparatus defined in claim 12 wherein the electric motor is constructed in accordance with the flux-collection principle to increase permanent magnet flux density in air gaps of the motor.

14. The fluid-displacement apparatus defined in claim 13, further comprising means for hermetically encapsulating said rotor and said stator.

15. The fluid-displacement apparatus defined in claim 14, further comprising means for fluid cooling of said stator.

16. The fluid-displacement apparatus defined in claim 15 wherein said duct is assembled from an intake section, a motor housing section and a diffusor section.

17. The fluid-displacement apparatus defined in claim 16 wherein said duct is formed of a plastic in a region of said stator.

* * * * *